(12) United States Patent
Liu

(10) Patent No.: US 10,380,197 B2
(45) Date of Patent: Aug. 13, 2019

(54) NETWORK SEARCHING METHOD AND NETWORK SEARCHING SYSTEM

(71) Applicant: BEIJING QIHOO TECHNOLOGY COMPANY LIMITED, Beijing (CN)

(72) Inventor: Fuqiang Liu, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 829 days.

(21) Appl. No.: 14/411,206

(22) PCT Filed: Jun. 13, 2013

(86) PCT No.: PCT/CN2013/077153
§ 371 (c)(1),
(2) Date: Dec. 24, 2014

(87) PCT Pub. No.: WO2014/000576
PCT Pub. Date: Jan. 3, 2014

(65) Prior Publication Data
US 2015/0242401 A1    Aug. 27, 2015

(30) Foreign Application Priority Data

Jun. 28, 2012 (CN) .......................... 2012 1 0222564

(51) Int. Cl.
*G06F 16/951* (2019.01)
*G06Q 10/10* (2012.01)
*G06Q 50/00* (2012.01)

(52) U.S. Cl.
CPC ........... *G06F 16/951* (2019.01); *G06Q 10/10* (2013.01); *G06Q 50/01* (2013.01)

(58) Field of Classification Search
CPC ........... G06F 17/30368; G06F 17/3051; G06F 17/30864; G06F 16/24565; G06F 16/2358; G06F 16/951; G06Q 10/10; G06Q 50/01
(Continued)

(56) References Cited

U.S. PATENT DOCUMENTS

2008/0201326 A1* 8/2008 Cotter ............... G06F 17/30864
2009/0271283 A1* 10/2009 Fosnacht .............. G06Q 20/123
705/26.1

(Continued)

OTHER PUBLICATIONS

International Search Report regarding PCT/CN2013/077153 dated Aug. 29, 2013, two pages.

(Continued)

*Primary Examiner* — James Trujillo
*Assistant Examiner* — Jessica N Le
(74) *Attorney, Agent, or Firm* — Polsinelli PC

(57) ABSTRACT

The present invention discloses a network searching method and a network searching system. The method comprises: extracting a webpage structure and an information type of a social networking site to form a database; searching according to a submitted keyword for webpage data relevant to the keyword; analyzing the searched webpage data relevant to the keywords according to the database to acquire description information of the webpage data, wherein the description information is corresponding to the information type of the social networking site; and presenting the description information along with the corresponding webpage data as a search result. According to the method and the system of the present invention, the website is formatted, detailed information in professional dimension is extracted, the description information of the type of social networking sites such as forums and blogs is finally acquired, and the
(Continued)

description information special to forums and blogs as the search result is displayed.

12 Claims, 7 Drawing Sheets

(58) Field of Classification Search
USPC .......................................................... 707/722
See application file for complete search history.

(56) References Cited

U.S. PATENT DOCUMENTS

| | | | | |
|---|---|---|---|---|
| 2012/0191577 A1* | 7/2012 | Gonsalves | ......... | G06Q 30/0601 705/27.2 |
| 2012/0203757 A1* | 8/2012 | Ravindran | ........ | G06F 17/30864 707/706 |
| 2013/0046747 A1* | 2/2013 | Gouyet | ............. | G06F 17/30864 707/709 |
| 2013/0080900 A1* | 3/2013 | Wilde | ............... | G06F 17/30893 715/736 |

OTHER PUBLICATIONS

English translation of abstract only of Chinese application CN1518702A, Title: Web page annotation systems, Publication Date: Aug. 4, 2004, Country: CN, Inventor(s): Markus Stolze, one page.

English translation of abstract only of Chinese application CN101097578A, Title: Network resource searching method and system, Publication Date: Jan. 2, 2008, Country: CN, Inventor(s): Ting Liu et al, one page.

English translation of abstract only of Chinese application CN101115024A, Title: Method and system for displaying web page contents related information, Publication Date: Jan. 30, 2008, Country: CN, Inventor(s): Wu Yong Ming et al, one page.

English translation of abstract only of Chinese application CN101878476A, Title: A Machine translation for query expansion, Publication Date: Jun. 20, 2008, Country: CN, Inventor(s): Stefan Li Cile et al, one page.

English translation of abstract only of Chinese application CN102169489A, Title: Information processing apparatus, keyword registration method, and program, Publication Date: Aug. 31, 2011, Country: CN, Inventor(s): Ichiro Small Linxian, one page.

* cited by examiner

NETWORK SEARCHING METHOD AND NETWORK SEARCHING SYSTEM

FIELD OF THE INVENTION

The present invention relates to the technical field of computers, and in particular relates to a network searching method and a network searching system.

BACKGROUND OF THE INVENTION

A search engine refers to a system for gathering information from the Internet according to a certain policy by using a specific computer program, organizing and processing the information, then providing a searching service for a user and presenting the information relevant to user's search to the user. A user inputs a keyword for searching, the search engine finds out webpages matching with the keyword from an index database, and for facilitating judgment of the user, the search engine also provides an abstract and other information derived from the webpage besides a webpage title and a URL (uniform resource locator).

However, the traditional search engine generally presents the search result without detailed and formatted analysis in a professional dimension, and can only acquires conventional information such as title, abstract, link and publication time, so all results of the traditional search engine generally only present webpage title, abstract, webpage link and publication time.

Webpages of social networking sites, such as forums and blogs, have special attributes of the social networking sites such as view count and reply count besides the conventional information including webpage title, abstract, webpage link, publication time and the like. Users of the forums and the blogs are often more interested in the special attributes, and the attributes may assist the users in judging the hot degree of the webpage and the like.

However, the traditional search engine without formatted analysis capability in professional dimension cannot present the special information to the users. Therefore, it is a technical problem to be urgently solved how to acquire a network searching and presenting mode particularly suitable for the webpages of the social networking sites such as forums and blogs.

SUMMARY OF THE INVENTION

In view of the above problems, a network searching method and a network searching system are provided for solving or at least partially solving or alleviating the above problems.

According to an aspect of the present invention, a network searching system is provided, including: a database management module, a database, a searching module, an analyzing module and a presenting module, wherein the database management module is configured to extract a webpage structure and an information type relevant to a social networking site to form the database; the database is configured to store the webpage structure and the information type relevant to the social networking site; the searching module is configured to search according to a submitted keyword for webpage data relevant to the keyword; the analyzing module is configured to analyze, according to the database, the searched webpage data relevant to the keyword, and acquire description information of the webpage data that is corresponding to the information type of the social networking site; and the presenting module is configured to present the description information along with the corresponding webpage data as a search result.

According to another aspect of the present invention, a network searching method is provided, including: extracting a webpage structure and an information type of a social networking site to form a database; searching according to a submitted keyword for webpage data relevant to the keyword; analyzing, according to the database, the searched webpage data relevant to the keyword, and acquiring description information of the webpage data that is corresponding to the information type of the social networking site; and presenting the description information along with the corresponding webpage data as a search result.

According to a further aspect of the present invention, a computer program is provided, including computer-readable codes, wherein when the computer-readable codes are running on a server, the server executes the network searching method of the claims.

According to a still further aspect of the present invention, a computer-readable medium is provided, storing the computer program referenced herein.

The present invention has the following beneficial effects.

1) In the present invention, the website is formatted analyzed, detailed information in a professional dimension is extracted, and finally the description information of the type of social networking sites such as forums and blogs is acquired. The description information special to forums and blogs is highlighted as a part of the search result, so that a user may quickly learn the basic facts of the webpage through these descriptions, e.g. learn the hot degree and the like by judging the click reply counts;

2) After the description information including source name, author name, view count and reply count is added to the presentation of the search result, especially for the source name and author name, webpage data may be searched according to the source name or the author name by clicking the source name or the author name, so that the search efficiency is improved and accurate formulation of the search range for the user is greatly facilitated.

3) The source name, author name, view count and reply count of the webpage data in the description information may change after being presented with the webpage data, and particularly the view counts and reply counts may change anytime. In the present invention, the webpage is constantly refreshed for updating when the search result such as the description information is being presented.

The above description is only generalization of technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and benefits are clear for those of ordinary skill in the art by reading the following detailed descriptions of preferred embodiments. The drawings are only intended to illustrate the preferred embodiments, and not interpreted as limiting to the present invention. Moreover, in all drawings, the same components are indicated by the same reference symbols. In the drawings.

DETAILED DESCRIPTION OF THE EMBODIMENTS

The present invention will be further described below in combination with the accompanying drawings and specific embodiments.

The core idea of the present invention lies in that: extracting a webpage structure and an information type relevant to a social networking site to form a database; searching according to a submitted keyword for webpage data relevant to the keyword; analyzing the searched webpage data relevant to the keyword according to the database to acquire description information of the webpage data corresponding to the information type of the social networking site; and presenting the description information along with the corresponding webpage data as a search result.

Figure 1:
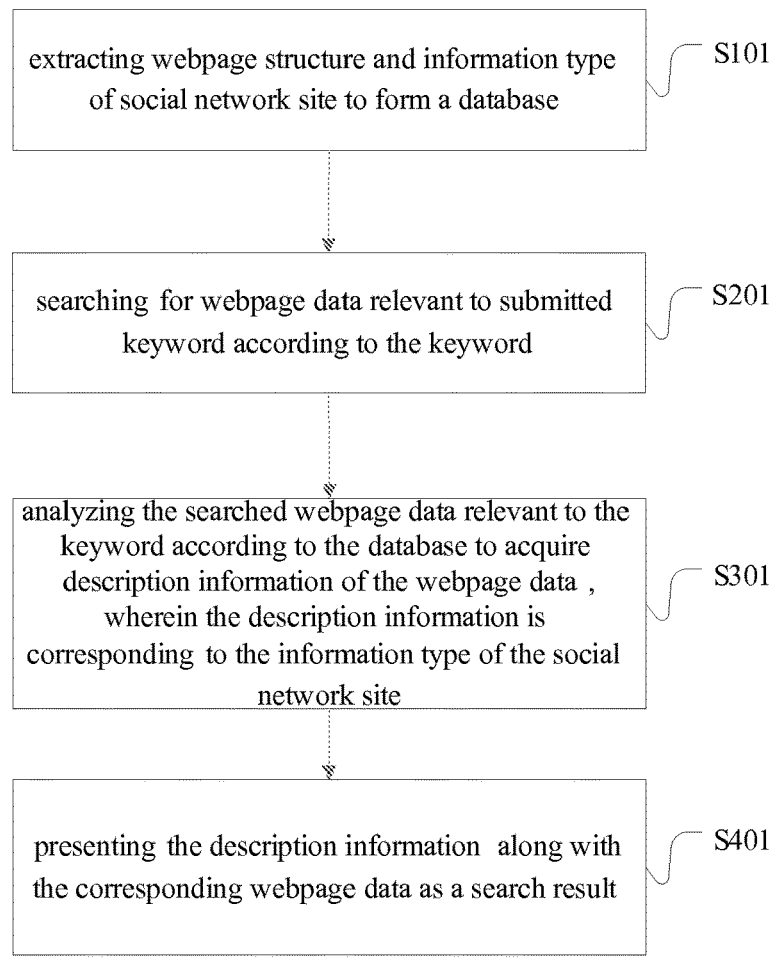
FIG. 1 schematically shows a flow diagram of a first method according to an embodiment of the present invention.

The method of the present invention will be described below with an embodiment. FIG. 1 shows a flow diagram of a first method of the embodiment of the present invention, and the method includes the following steps.

Step 101, extracting a webpage structure and an information type of a social networking site to form a database.

Webpage Structure

A webpage with rich contents, colors and functions is logically divided so as to abstract the webpage into layout blocks or attributed sections, namely, the webpage structure. The webpage structure is very friendly to a search engine, so that the search engine can position an area and capture information therein. The webpage structure may be a personalized webpage structure of each social networking site or a common webpage structure obtained by statistically summarizing social networking sites.

The attributed sections may be roughly divided into a head section and a body section or finely divided into a title section, an author section, a keyword section, a webpage information section, a background section, a music section, a font section, a text section and a link section.

Of course, besides the above division method according to the abstracted attributed sections, the webpage may be divided according to the contents of the webpage into vivid layout blocks, e.g. a content navigation area, a link information area, a text information area, an interactive operation area and a site information area.

Information Type

The information type is a special information type which is relatively important and valuable for the social networking site, e.g. reply counts, view counts and the like. The information type may be a personalized information type of each social networking site or a common information type obtained by statistically summarizing social networking sites. The social networking site at least includes one or more of forum, post bar, bulletin board, group discussion site, online chat site, dating site, personal space, blog, microblog and other social networking sites.

Step S201, searching according to a submitted keyword for webpage data relevant to the keyword.

Step S301, analyzing the searched webpage data relevant to the keyword according to the database to acquire description information of the webpage data, wherein the description information is adaptive to the information type of the social networking site.

The webpage data is formatted according to the webpage structure in the database and divided into a plurality of areas. As said in step S101, the areas may be divided according to the layout block or the attributed section, and such a manner is favorable for detailed analysis in professional dimension. The corresponding description information lies usually in the specific layout block or attributed section, and a corresponding relation exists between the description information and the layout block or the attributed section, so that the description information may be positioned fast, e.g. the author name of the webpage data is usually positioned in the author section.

The description information is acquired in the corresponding area obtained after the webpage data is formatted according to each information type in the database. The description information is adaptive to the information type of the social networking site, wherein the description information should at least include one or more of source name, author name, view count and reply count of the webpage data.

Step S401, presenting the description information along with the corresponding webpage data as a search result.

According to the method of the present invention, the website is formatted, detailed information in professional dimension is extracted, and finally the description information of the type of social networking site such as forums and blogs is acquired. The description information special to forums and blogs is highlighted, so that a user may quickly learn the basic facts of the webpage through these descriptions, e.g. learn the hot degree and the like by judging the click reply counts.

Figure 2:
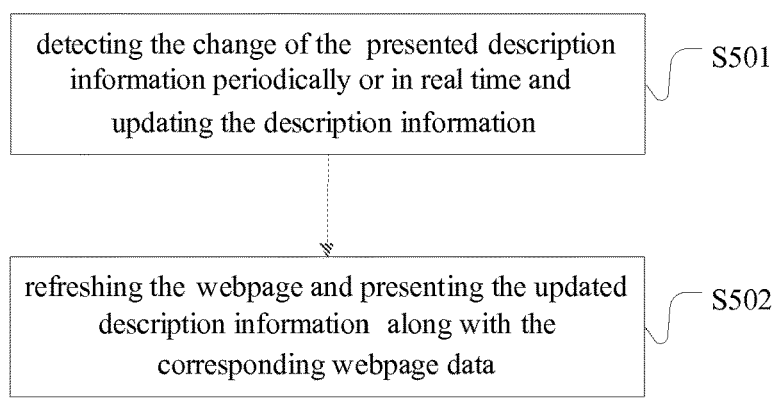
FIG. 2 schematically shows a flow diagram of a second method according to an embodiment of the present invention.

The method of the present invention will be further described below with an embodiment. FIG. 2 shows a flow diagram of a second method according to an embodiment of the present invention. The source name, author name, view count and reply count of the webpage data in the description information may be changed after being presented with the webpage data, especially the view count and reply count may change anytime. After such sensitive information is presented in step S401, the following operations should also be performed:

Step S501, detecting the change of the presented description information periodically or in real time and updating the description information;

Step S502, refreshing the webpage and presenting the updated description information along with the corresponding webpage data.

Figure 3:
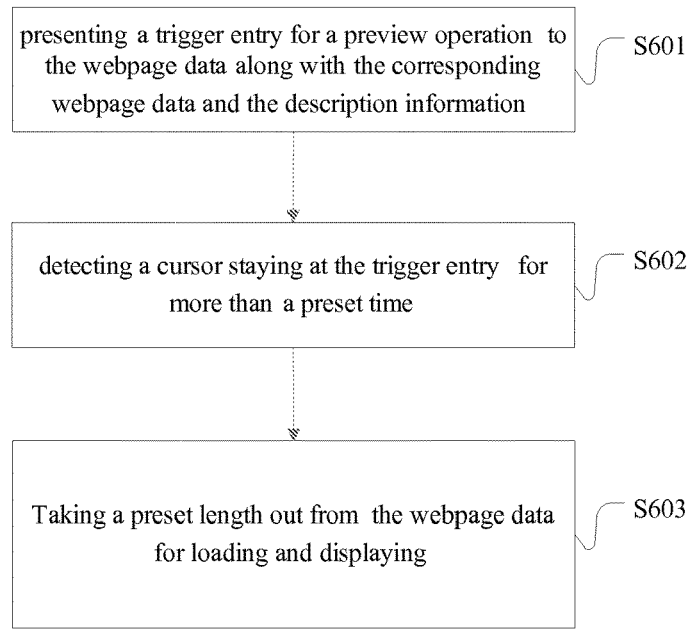
FIG. 3 schematically shows a flow diagram of a third method according to an embodiment of the present invention.

The method of the present invention will be further described below with an embodiment. FIG. 3 shows a flow diagram of a third method according to an embodiment of the present invention. If a certain search result cannot be opened or the opening speed is very low, the webpage data may be quickly browsed in a preview manner, and the previewed page is directly called from the original webpage. Accordingly, after the presenting is completed in step S401, the following operations may also be performed:

Step S601, presenting a trigger entry for a preview operation to the webpage data along with the corresponding webpage data and the description information;

Step S602, detecting a cursor staying at the trigger entry for more than a preset time; and Step S603, taking out from the webpage data a preset length for loading and displaying.

The displaying includes displaying in a thumbnail form or displaying after all webpage rendering effects are removed.

Removing all the webpage rendering effects means that only text contents are reserved and non-text information such as pictures and music are removed.

Figure 4:
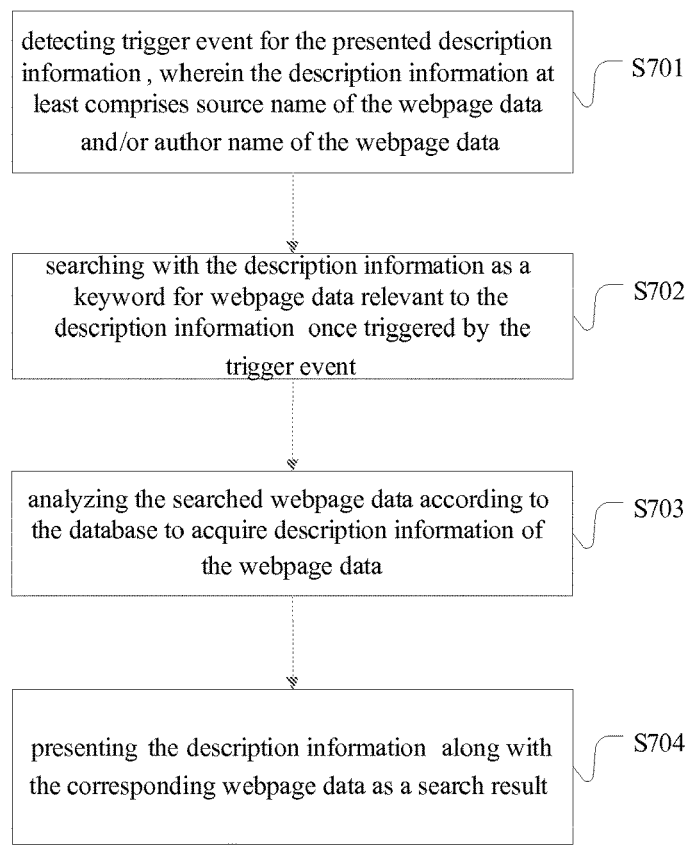
FIG. 4 schematically shows a flow diagram of a fourth method according to an embodiment of the present invention.

The method of the present invention will be further described below with an embodiment. FIG. 4 shows a flow diagram of a fourth method according to an embodiment of the present invention. After the description information including source name, author name, view count and reply count is added to the presentation of the search result, especially for the source name and author name, webpage data may be searched according to the source name or the author name by clicking the source name or the author name, so that the search efficiency is increased and accurate formulation of the search range for the user is greatly facilitated. After the presenting is completed in step S401, the following operations may also be performed:

Step S701, detecting a trigger event for the presented description information, wherein the description information at least includes source name of the webpage data and/or author name of the webpage data, wherein the source name includes forum name, blog name, block name or the like.

Step S702, searching with the description information as a keyword for webpage data relevant to the description information, which is triggered by the trigger event;

Step S703, analyzing the searched webpage data according to the database to acquire description information of the webpage data; and Step S704, presenting the description information along with the corresponding webpage data as a search result.

The system of the present invention will be described below with four embodiments, the system corresponds to the flow of the above method, and for the differences, reference may be made to the above method.

Figure 5:
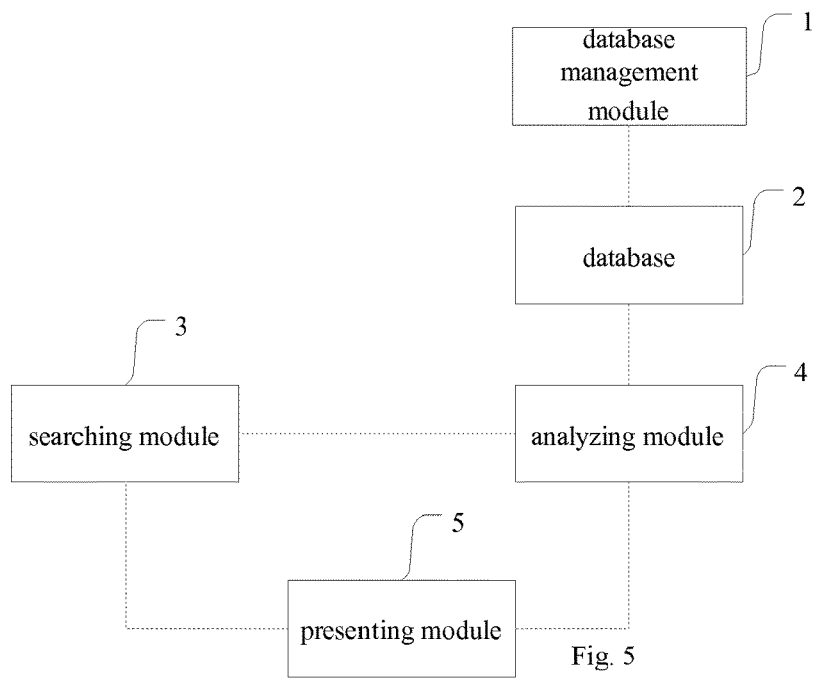
FIG. 5 schematically shows a structural diagram of a first system according to an embodiment of the present invention.

The system of the present invention will be described below with an embodiment. FIG. 5 shows a structural diagram of a first system according to an embodiment of the present invention. The network searching system includes a database management module 1, a database 2, a searching module 3, an analyzing module 4 and a presenting module 5.

The database management module 1 is configured to extract a webpage structure and an information type relevant to a social networking site to form the database 2.

The database 2 is configured to store the webpage structure and the information type relevant to the social networking site.

The searching module 3 is configured to search according to a submitted keyword for webpage data relevant to the keyword.

The analyzing module 4 is configured to analyze, according to the database 2, the searched webpage data relevant to the keyword searched by the searching module 3 to acquire description information of the webpage data, wherein the description information is corresponding to the information type of the social networking site. Specifically, the analyzing module 4 is further configured to decompose the webpage data into a plurality of layout blocks or attributed sections according to the webpage structure in the database, and acquire the description information from the corresponding layout blocks or attributed sections decomposed from the webpage data according to each information type in the database.

The presenting module 5 is configured to present the description information acquired by the analyzing module 4 along with the corresponding webpage data searched by the searching module 3 as a search result.

Figure 6:
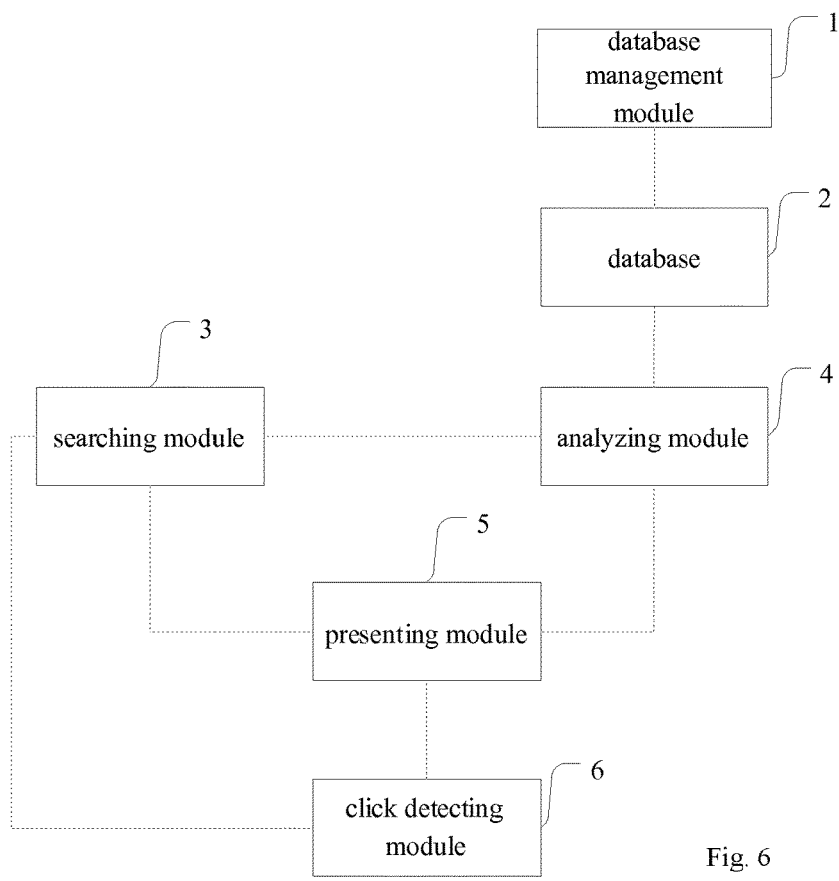
FIG. 6 schematically shows a structural diagram of a second system according to an embodiment of the present invention.

The system of the present invention will be further described below with an embodiment. FIG. 6 shows a structural diagram of a second system according to an embodiment of the present invention. The network searching system includes a database management module 1, a database 2, a searching module 3, an analyzing module 4 and a presenting module 5.

The functions of the database management module 1, the database 2, the searching module 3, the analyzing module 4 and the presenting module 5 are as mentioned above and are not repeated.

The network searching system further includes a click detecting module 6.

The click detecting module 6 is configured to detect a trigger event for the description information presented by the presenting module 5, wherein the description information at least includes source name of the webpage data and/or author name of the webpage data.

The searching module 3 is further configured to search with the description information as a keyword for the webpage data relevant to the description information triggered by the trigger event detected by the click detecting module 6.

The analyzing module 4 is configured to analyze the webpage data searched by the searching module 3 according to the database 2 to acquire description information of the webpage data, wherein the description information is adaptive to the information type of the social networking site. Specifically, the analyzing module 4 is further configured to decompose the webpage data into a plurality of layout blocks or attributed sections according to the webpage structure in the database, and acquire the description information from the corresponding layout blocks or attributed sections decomposed from the webpage data according to each information type in the database The presenting module 5 is configured to present the description information acquired by the analyzing module 4 along with the corresponding webpage data searched by the searching module 3 as a search result.

Figure 7:
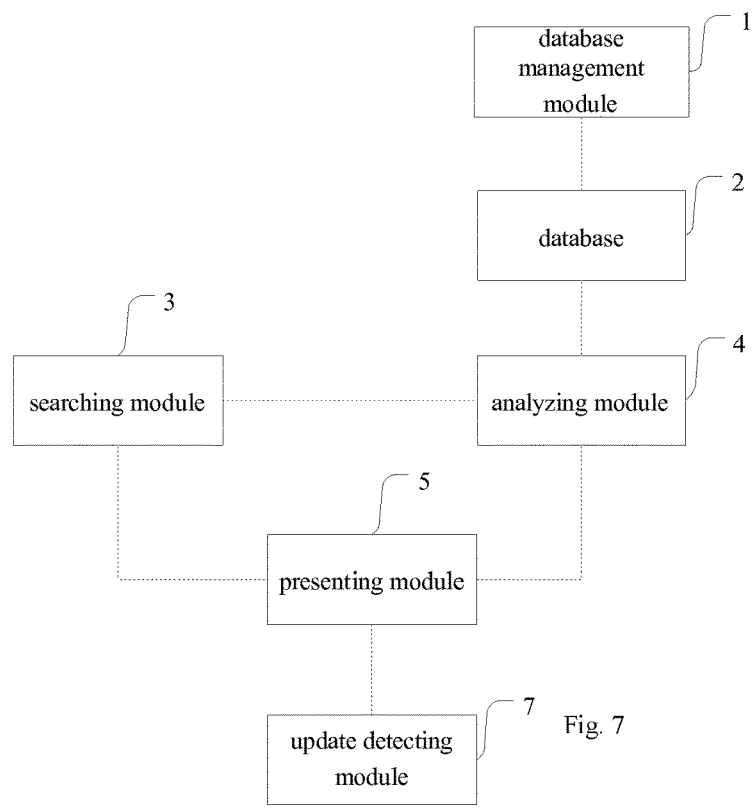
FIG. 7 schematically shows a structural diagram of a third system according to an embodiment of the present invention.

The system of the present invention will be further described below with an embodiment. FIG. 7 shows a structural diagram of a third system according to an embodiment of the present invention. The network searching system includes a database management module 1, a database 2, a searching module 3, an analyzing module 4 and a presenting module 5.

The functions of the database management module 1, the database 2, the searching module 3, the analyzing module 4 and the presenting module 5 are as mentioned above and are not repeated.

The network searching system further includes an update detecting module 7.

The update detecting module 7 is configured to detect the change of the description information presented by the presenting module 5 periodically or in real time and update the description information.

The presenting module 5 is further configured to receive a refreshing notification from the update detecting module 7 to refresh the webpage, and present the updated description information along with the corresponding webpage data.

Figure 8:
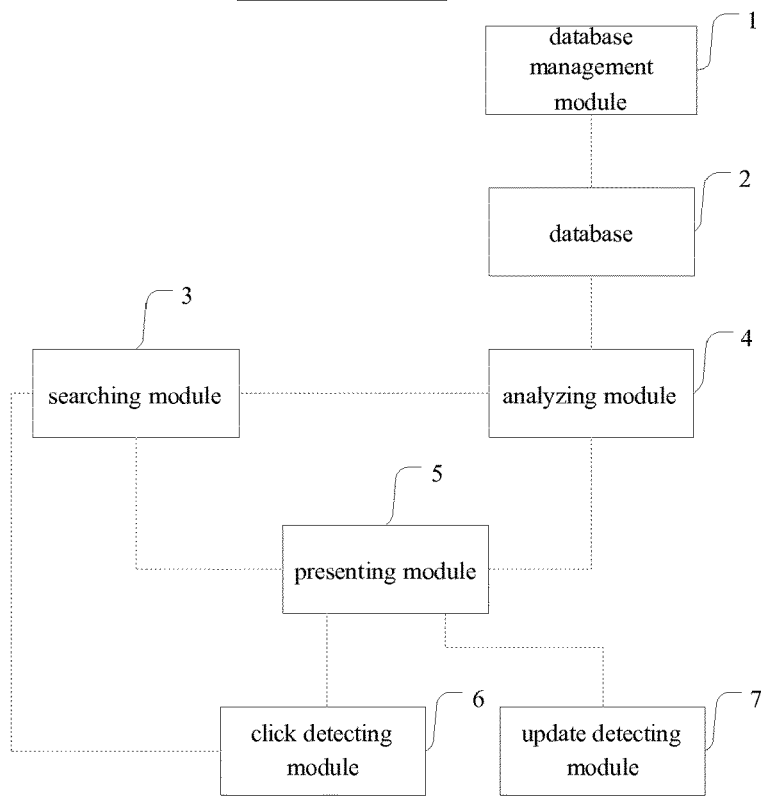
FIG. 8 schematically shows a structural diagram of a fourth system according to an embodiment of the present invention.

The system of the present invention will be further described below with an embodiment. FIG. 8 shows a structural diagram of a fourth system according to an embodiment of the present invention. The network searching system includes a database management module 1, a database 2, a searching module 3, an analyzing module 4, a presenting module 5 and a click detecting module 6.

The functions of the database management module 1, the database 2, the searching module 3, the analyzing module 4, the presenting module 5 and the click detecting module 6 are mentioned above and are not repeated.

The network searching system further includes an update detecting module 7.

The update detecting module 7 is configured to detect the change of the description information presented by the presenting module 5 periodically or in real time and update the description information.

The presenting module 5 is further configured to receive a notification from the update detecting module 7 to refresh the webpage, and present the updated description information along with the corresponding webpage data.

Figure 9:
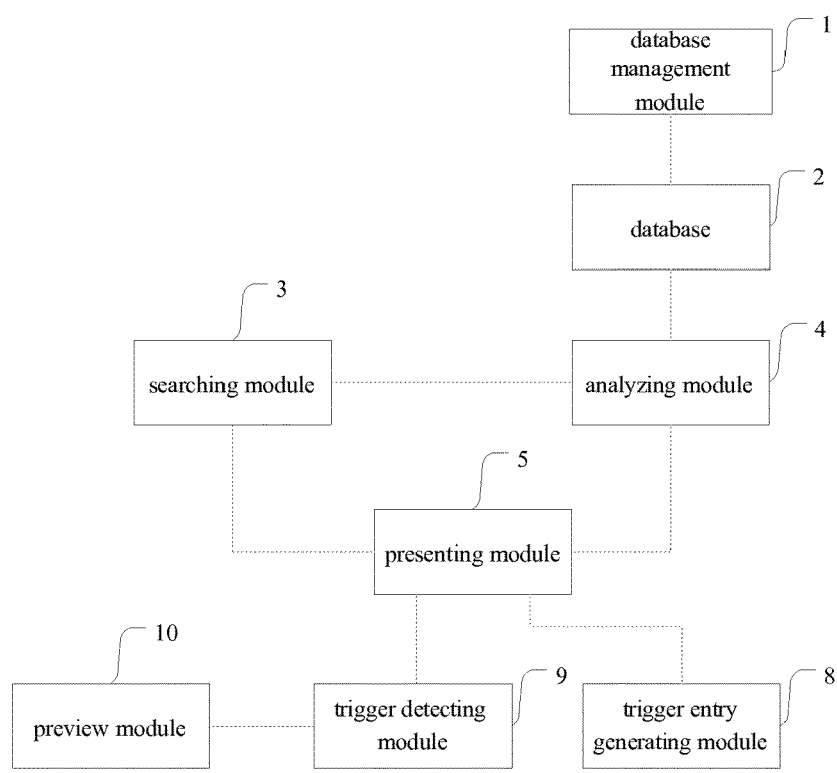
FIG. 9 schematically shows a structural diagram of a fifth system according to an embodiment of the present invention.

The system of the present invention will be further described below with an embodiment. FIG. 9 shows a structural diagram of a fifth system according to an embodiment of the present invention. The network searching system includes a database management module 1, a database 2, a searching module 3, an analyzing module 4 and a presenting module 5.

The functions of the database management module 1, the database 2, the searching module 3, the analyzing module 4 and the presenting module 5 are as mentioned above and are not repeated.

The network searching system further includes a trigger entry generating module 8, a trigger detecting module 9 and a preview module 10.

The trigger entry generating module 8 is configured to generate a trigger entry for a preview operation to the webpage data.

The presenting module 5 is further configured to present the trigger entry generated by the trigger entry generating module 8, along with the corresponding webpage data and the description information.

The trigger detecting module 9 is configured to notify the preview module 10 when a cursor staying at the trigger entry presented by the presenting module 5 for more than a preset time is detected.

The preview module 10 is configured to take out from the webpage data a preset length for loading and displaying when the notification from the trigger detecting module is received, wherein the displaying includes displaying in a thumbnail form or displaying without any webpage rendering effects.

Figure 10:
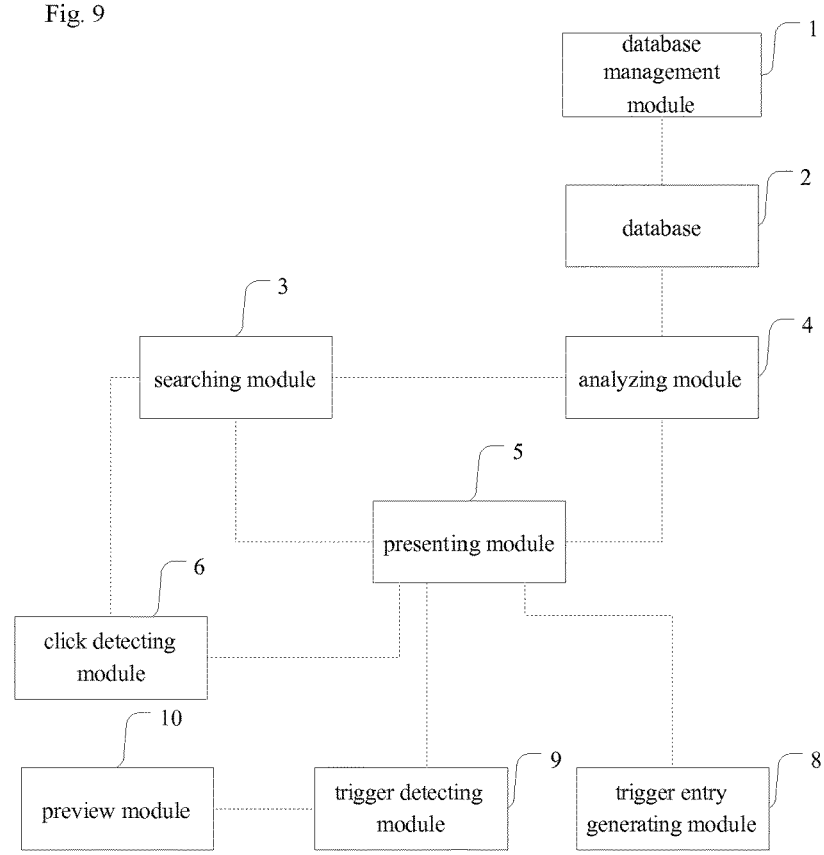
FIG. 10 schematically shows a structural diagram of a sixth system according to an embodiment of the present invention.

The system of the present invention will be further described below with an embodiment. FIG. 10 shows a structural diagram of a sixth system according to an embodiment of the present invention. The network searching system includes a database management module 1, a database 2, a searching module 3, an analyzing module 4, a presenting module 5 and a click detecting module 6.

The functions of the database management module 1, the database 2, the searching module 3, the analyzing module 4, the presenting module 5 and the click detecting module 6 are as mentioned above and are not repeated.

The network searching system further includes a trigger entry generating module 8, a trigger detecting module 9 and a preview module 10.

The trigger entry generating module 8 is configured to generate a trigger entry for a preview operation to the webpage data.

The presenting module 5 is further configured to present the trigger entry generated by the trigger entry generating module 8, along with the corresponding webpage data and the description information.

The trigger detecting module 9 is configured to notify the preview module 10 when a cursor staying at the trigger entry presented by the presenting module 5 for more than a preset time is detected.

The preview module 10 is configured to intercept the webpage data of a preset length for loading and displaying when the notification from the trigger detecting module is received, wherein the displaying includes displaying in a thumbnail form or displaying after all webpage rendering effects are removed.

Figure 11:
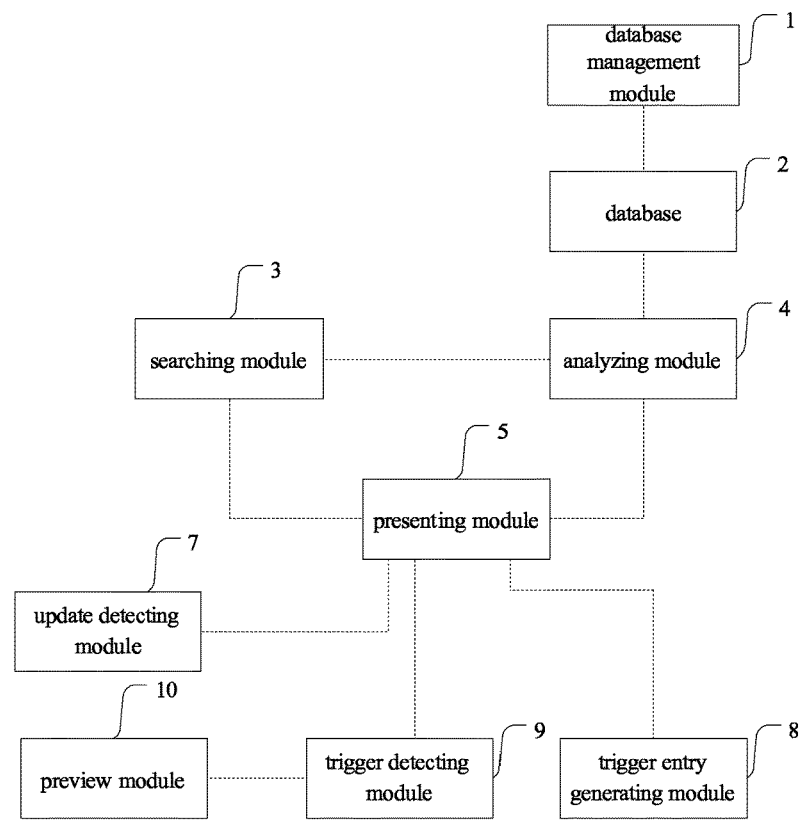
FIG. 11 schematically shows a structural diagram of a seventh system according to an embodiment of the present invention.

The system of the present invention will be further described below with an embodiment. FIG. 11 shows a structural diagram of a seventh system according to an embodiment of the present invention. The network searching system includes a database management module 1, a database 2, a searching module 3, an analyzing module 4, a presenting module 5 and an update detecting module 7.

The functions of the database management module 1, the database 2, the searching module 3, the analyzing module 4, the presenting module 5 and the update detecting module 7 are as mentioned above and are not repeated.

The network searching system further includes a trigger entry generating module 8, a trigger detecting module 9 and a preview module 10.

The trigger entry generating module 8 is configured to generate a trigger entry for a preview operation of the webpage data.

The presenting module 5 is further configured to present the trigger entry generated by the trigger entry generating module 8, along with the corresponding webpage data and the description information.

The trigger detecting module 9 is configured to notify the preview module 10 when a cursor staying at the trigger entry presented by the presenting module 5 for more than a preset time is detected.

The preview module 10 is configured to take out from the webpage data a preset length and load and display it when the notification from the trigger detecting module is received, wherein the displaying includes displaying in a thumbnail form or displaying without any webpage rendering effects.

Figure 12:
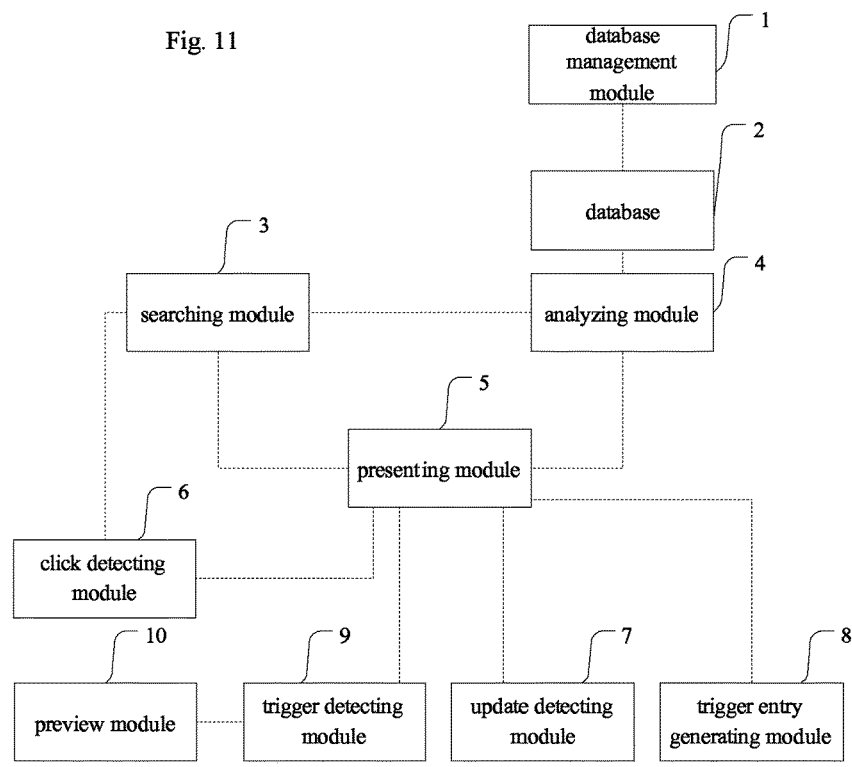
FIG. 12 schematically shows a structural diagram of an eighth system according to an embodiment of the present invention.

The system of the present invention will be further described below with an embodiment. FIG. 12 shows a structural diagram of an eighth system according to an embodiment of the present invention. The network searching system includes a database management module 1, a database 2, a searching module 3, an analyzing module 4, a presenting module 5, a click detecting module 6 and an update detecting module 7.

The functions of the database management module 1, the database 2, the searching module 3, the analyzing module 4, the presenting module 5, the click detecting module 6 and the update detecting module 7 are as mentioned above and are not repeated.

The network searching system further includes a trigger entry generating module 8, a trigger detecting module 9 and a preview module 10.

The trigger entry generating module 8 is configured to generate a trigger entry for a preview operation to the webpage data.

The presenting module 5 is further configured to present the trigger entry generated by the trigger entry generating module 8, along with the corresponding webpage data and the description information.

The trigger detecting module 9 is configured to notify the preview module 10 when a cursor staying at the trigger entry presented by the presenting module 5 for more than a preset time is detected.

The preview module 10 is configured to intercept the webpage data of a preset length for loading and displaying when the notification from the trigger detecting module is received, wherein the displaying includes displaying in a thumbnail form or displaying without any webpage rendering effects.

It should be noted that, the embodiments in the present invention and the features in the embodiments may be combined with one another in any way without conflicts.

Each component embodiment of the present invention may be implemented by hardware, software modules running in one or more processors or a combination of hardware and software modules. Those skilled in the art should understand that, some or all functions of some or all components in the network searching system according to the embodiments of the present invention may be realized by a microprocessor or a digital signal processor (DSP) in practice. The present invention may also be implemented as part of or all of equipment or device programs (e.g. computer programs and computer program products) for executing the method described herein. Based on this implementation, the programs of the present invention may be stored in a computer-readable medium, or may have a form of one or multiple signals. Such signals may be obtained by downloading from Internet websites, provided on carrier signals or provided in any other form.

Figure 13:
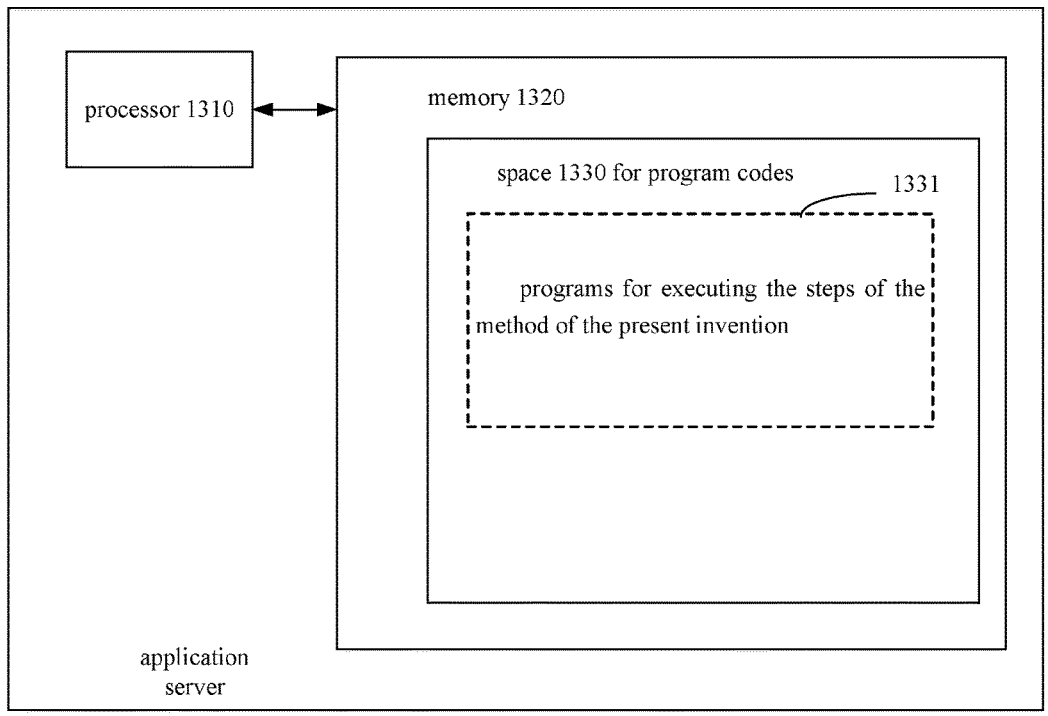
FIG. 13 schematically shows a block diagram of a server for executing the method of the present invention.
Figure 14:
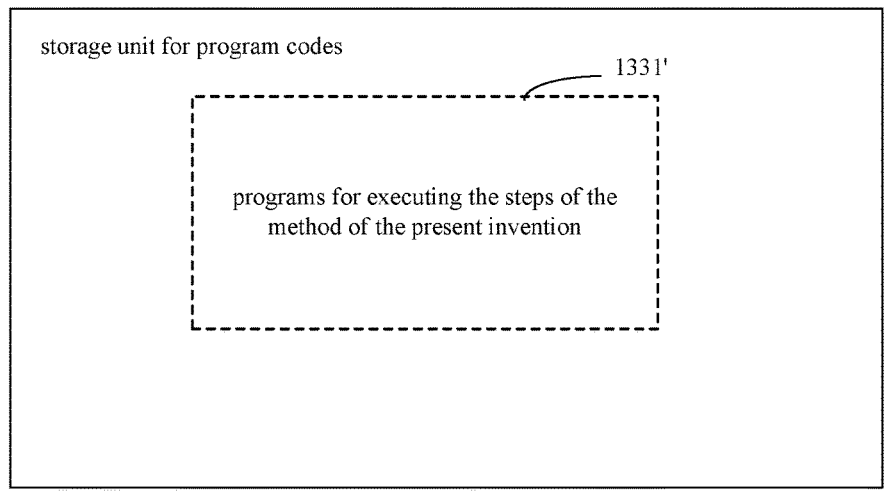
FIG. 14 schematically shows a storage unit for keeping or carrying program codes for implementing the method of the present invention.

For example, FIG. 13 shows a server capable of implementing the network searching method according to the present invention, e.g. an application server. The server traditionally includes a processor 1310 and computer program products or computer-readable media in the form of a memory 1320. The memory 1320 may be an electronic memory such as a flash memory, an EEPROM (electrically erasable programmable read-only memory), an EPROM, a hard disk, an ROM (read-only memory) or the like. The memory 1320 has a storage space 1330 for program codes 1331 for executing any method step in the above-mentioned method. For example, the storage space 1330 for the program codes may include the program codes 1331 for implementing all the steps of the above method. These program codes may be read from or written into one or more computer program products. These computer program products include program code carriers such as a hard disk, a compact disk (CD), a storage card or a soft disk. Such computer program products are generally portable or fixed storage units as mentioned in FIG. 14. The storage unit may be provided with a storage section, a storage space and the like arranged like the server 1320 in the server of FIG. 13. The program codes may be compressed in an appropriate form. Generally, the storage unit includes computer-readable codes 1331', namely codes which may be read by the processor 1310, and when these codes are miming in the server, the server executes each step in the above-described method.

"An embodiment", "embodiment" or "one or more embodiments" described above indicate that specific features, structures or characteristics described in combination with the embodiments are included in at least one embodiment of the present invention. Moreover, please note that the term example "in an embodiment" herein may not be in the same embodiment.

A large amount of specific details are described in the description provided herein. However, it could be understood that, the embodiments of the present invention may be practiced in the absence of these specific details. In some examples, well-known methods, structures and technologies are not described in detail, so that the description won't be vaguely understood.

It should be noted that the above-mentioned embodiments are used for describing the present invention, rather than limiting the present invention, and alternative embodiments may be designed by those skilled in the art without departing from the scope of the appended claims. The claims should not be limited to any reference signs between brackets. The term "include" does not exclude components or steps which are not listed in the claims. "A" or "one" ahead of a component does not exclude multiple such components. The present invention may be implemented by means of hardware including a plurality of different components and by means of an appropriately programmed computer. In the claims listing a plurality of devices, a plurality of these devices may be specifically embodied by the same hardware item. Terms "first, second, third and the like" do not indicate any sequence, and these terms may be interpreted as names.

Moreover, it should also be noted that, the language used in the description is selected mainly for the purposes of readability and teaching, rather than explaining or limiting the subjects of the present invention. Accordingly, many modifications and alterations are obvious to those of ordinary skill in the art without departing from the scope and spirit of the appended claims. For the scope of the present invention, the disclosure of the present invention is illustrative rather than limiting, and the scope of the present invention is defined by the appended claims.

What is claimed is:

1. A network searching system, comprising:
   a database; and at least one processor to execute a plurality of modules comprising a database management module, a searching module, an analyzing module, a presenting module, and a click detecting module, wherein, the database management module statistically summarizes social networking sites to obtain a common webpage structure and extracts an information type relevant to the social networking sites to form the database;

the database stores the common webpage structure and the information type relevant to the social networking sites;

the searching module searches according to a submitted keyword for webpage data relevant to the keyword;

the analyzing module analyzes, according to the database, the searched webpage data relevant to the keyword, and acquires description information of the webpage data that corresponds to the information type of the social networking sites;

the presenting module presents the description information along with the corresponding webpage data as a search result, the click detecting module detects a trigger event for the presented description information, and the description information at least comprises a source name of the webpage data and/or an author name of the webpage data; and the searching module searches with the description information as a keyword for webpage data relevant to the description information, which is triggered by the trigger event, wherein, the analyzing module acquires description information of the webpage data that corresponds to the information type of the social networking sites comprises:

decomposing the webpage data into a plurality of layout blocks according to the common webpage structure in the database, and acquiring the description information from the corresponding layout blocks decomposed from the webpage data according to the information type in the database.

2. The network searching system of claim 1, further comprising an update detecting module, wherein the update detecting module detects a change of the presented description information periodically or in real time and updates the description information; and wherein the presenting module receives a notification from the update detecting module to refresh the webpage to present the updated description information along with the corresponding webpage data.

3. The network searching system of claim 1, further comprising a trigger entry generating module, a trigger detecting module and a preview module, wherein, the trigger entry generating module generates a trigger entry for a preview operation to the webpage data;

the presenting module presents the trigger entry along with the corresponding webpage data and the description information;

the trigger detecting module notifies the preview module when a cursor staying at the trigger entry for more than a preset time is detected; and the preview module truncates from the webpage data a preset length for loading and displaying when the notification from the trigger detecting module is received.

4. The network searching system of claim 3, wherein the displaying comprises displaying in a thumbnail form or displaying without any webpage rendering effect.

5. The network searching system of claim 1, wherein the description information acquired by the analyzing module at least comprises one or more of a source name, an author name, a view count, and a reply count of the webpage data.

6. A network searching method, comprising:

statistically summarizing, by at least one processor, social networking sites to obtain a common webpage structure and extracting an information type of the social networking sites to form a database;

searching, by the at least one processor, according to a submitted keyword for webpage data relevant to the keyword;

analyzing, by the at least one processor, according to the database, the searched webpage data relevant to the keyword, and acquiring description information of the webpage data that corresponds to the information type of the social networking site;

presenting, by the at least one processor, the description information along with the corresponding webpage data as a search result;

detecting, by the at least one processor, a trigger event for the presented description information, wherein the description information at least comprises a source name of the webpage data and/or an author name of the webpage data; and searching, by the at least one processor, with the description information as a keyword for webpage data relevant to the description information, which is triggered by the trigger event, wherein, the acquiring description information of the webpage data that corresponds to the information type of the social networking sites comprises:

decomposing the webpage data into a plurality of layout blocks according to the common webpage structure in the database, and acquiring the description information from the corresponding layout blocks decomposed from the webpage data according to the information type in the database.

7. The network searching method of claim 6, wherein after presenting the description information along with the webpage data, the method further comprises:

detecting a change of the presented description information periodically or in real time and updating the description information; and refreshing the webpage to present the updated description information along with the corresponding webpage data.

8. The network searching method of claim 6, wherein after presenting the description information along with the corresponding webpage data, the method further comprises:

presenting a trigger entry for a preview operation to the webpage data along with the corresponding webpage data and the description information;

detecting a cursor staying at the trigger entry for more than a preset time; and truncating from the webpage data a preset length, and loading and displaying the webpage data.

9. The network searching method of claim 8, wherein the displaying comprises displaying in a thumbnail form or displaying after webpage rendering effects are removed.

10. The network searching method of claim 6, wherein the description information at least comprises one or more of a source name, an author name, a view count and a reply count of the webpage data.

11. The network searching method of claim 6, wherein each social networking site at least comprises one or more of a forum, a post bar, a bulletin board, a group discussion site, an online chat site, a dating site, a personal space, a blog, a microblog, and another social networking site.

12. A non-transitory computer readable medium having instructions stored thereon that, when executed by at least one processor, cause the at least one processor to execute operations, comprising:

statistically summarizing social networking sites to obtain a common webpage structure and extracting an information type of the social networking sites to form a database;

searching according to a submitted keyword for webpage data relevant to the keyword;

analyzing, according to the database, the searched webpage data relevant to the keyword, and acquiring description information of the webpage data that corresponds to the information type of the social networking sites;

presenting the description information along with the corresponding webpage data as a search result;

detecting a trigger event for the presented description information, wherein the description information at least comprises a source name of the webpage data and/or an author name of the webpage data; and searching with the description information as a keyword for webpage data relevant to the description information, which is triggered by the trigger event, wherein, the acquiring description information of the webpage data that corresponds to the information type of the social networking sites comprises:

decomposing the webpage data into a plurality of layout blocks according to the common webpage structure in the database, and acquiring the description information from the corresponding layout blocks decomposed from the webpage data according to the information type in the database.

* * * * *